(12) United States Patent
Ikawa et al.

(10) Patent No.: US 8,869,606 B2
(45) Date of Patent: Oct. 28, 2014

(54) PM EMISSION AMOUNT ESTIMATION DEVICE FOR DIESEL ENGINE

(75) Inventors: Yoshikatsu Ikawa, Tokyo (JP); Masato Mitsuhashi, Tokyo (JP); Kazunari Ide, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 257 days.

(21) Appl. No.: 13/386,142

(22) PCT Filed: Jun. 11, 2010

(86) PCT No.: PCT/JP2010/059939
§ 371 (c)(1),
(2), (4) Date: Mar. 19, 2012

(87) PCT Pub. No.: WO2011/018918
PCT Pub. Date: Feb. 17, 2011

(65) Prior Publication Data
US 2012/0174653 A1 Jul. 12, 2012

(30) Foreign Application Priority Data

Aug. 10, 2009 (JP) ................................ 2009-185629
Feb. 15, 2010 (JP) ................................ 2010-030025

(51) Int. Cl.
*G01M 15/10* (2006.01)
*F01N 9/00* (2006.01)
*F01N 3/021* (2006.01)
*F02D 41/14* (2006.01)

(52) U.S. Cl.
CPC ............. *F01N 9/002* (2013.01); *F02D 41/1456* (2013.01); *F01N 3/021* (2013.01); *Y02T 10/20* (2013.01); *F01N 2900/1606* (2013.01); *F02D 41/1467* (2013.01); *Y02T 10/47* (2013.01); *F02D 2200/0812* (2013.01)

USPC .................. 73/114.71; 73/114.72; 73/114.73; 73/31.07

(58) Field of Classification Search
USPC ............................. 73/114.71, 114.72, 114.73
See application file for complete search history.

(56) References Cited

U.S. PATENT DOCUMENTS 7,319,928 B2 * 1/2008 Hodjati et al. ................ 701/102

FOREIGN PATENT DOCUMENTS

| JP | 2000-213395 | 8/2000 |
| JP | 2006-316682 | 11/2006 |
| JP | 2007-23959 | 2/2007 |
| JP | 2008-57486 | 3/2008 |
| JP | 2008-215210 | 9/2008 |
| JP | 2009-36025 | 2/2009 |

OTHER PUBLICATIONS

International Search Report issued Aug. 31, 2010 in corresponding International Application No. PCT/JP2010/059939.
International Preliminary Report on Patentability and Written Opinion of the International Searching Authority issued Mar. 13, 2012 in corresponding International Application No. PCT/JP2010/059939.

* cited by examiner

*Primary Examiner* — Paul West
(74) *Attorney, Agent, or Firm* — Wenderoth, Lind & Ponack, L.L.P.

(57) ABSTRACT

Providing a PM emission amount estimation device for the diesel engine wherein the accuracy of the correction in correcting the basic level of the PM emission amount by use of the PM emission amount estimation map can be enhanced; and, the PM emission amount particularly during the transient state of the engine operation condition can be accurately computed so as to estimate, with high precision, the PM emission amount and the PM emission accumulated-amount (integrated amount) during the whole engine operation conditions including the transient state as well as the steady state.

A PM emission amount estimation device for estimating the amount of the PM for estimating the amount of the PM that is emitted from a diesel engine and collected by a DPF provided in the exhaust gas passage of the engine, the device including, but not limited to: a PM emission amount estimation base-map 3 with which the base PM emission amount is computed in response to the operation condition of the engine; a PM emission amount estimation correction-map 5 that determines a correction factor for correcting the base PM emission amount computed by the PM emission amount estimation base-map 3, the correction factor being determined in response to the transient engine operation condition; a transient state judgment device 7 that judges that the engine is operated in a transient operation condition based on the change of the air excess ratio regarding the engine; a PM emission amount computation device 9 that corrects the computed base PM emission amount by multiplying the computed base PM emission amount by the correction factor computed with the PM emission amount estimation correction-map 5 only in a case where it is judged, by the transient state judgment device 7, that the engine is in a transient operation condition whereas the base PM emission amount is directly outputted in a case where it is judged that the engine is in a steady operation condition.

11 Claims, 8 Drawing Sheets

PM EMISSION AMOUNT ESTIMATION DEVICE FOR DIESEL ENGINE

BACKGROUND OF THE INVENTION

1. Field of the Invention

The present invention relates to a PM emission estimation device for estimating the emission amount of the PM (Particulate Matter) in the exhaust gas emitted from a diesel engine.

2. Background of the Invention

Patent Reference 1 (JP2007-23959) discloses a technology regarding a PM emission estimation device for estimating the emission amount of the PM (Particulate Matter) in the exhaust gas emitted from a diesel engine.

In the disclosure of Patent Reference 1, as shown In FIG. 14, the block diagram regarding the PM emission estimation device is configured with:

- a PM emission amount estimation map 01 by which the basic level of the PM emission amount is computed based on the engine speed Ne and the fuel injection quantity Qf as the variables with regard to the engine operation condition;
- a PM emission amount estimation correction factor map 03 by which the correction factor for correcting the PM emission amount estimation is computed by use of the difference $(r\lambda - t\lambda)$ between the actual air excess ratio $r\lambda$ and the target air excess ratio $t\lambda$, or by use of the ratio $(r\lambda/t\lambda)$ of the actual air excess ratio $r\lambda$ to the target air excess ratio $t\lambda$, the target air excess ratio $t\lambda$ and the actual air excess ratio $r\lambda$ being set as the first parameter $P_A$ and the second parameter $P_B$, respectively, wherein the emission amount of the PM is computed by multiplying the basic level of the PM emission amount obtained by use of the PM emission amount estimation map 01 by the correction factor computed by use of the PM emission amount estimation correction factor map 03.

Further, the corrected PM emission amount having been corrected by use of the correction factor is integrated at the an integrator (an integration section) 07 so that the amount of the PM which is accumulated in a DPF (Diesel Particulate Filter) provided in the exhaust gas passage of a diesel engine is estimated, the DPF being provided for collecting the PM.

REFERENCES

Patent References

Patent Reference 1; JP2007-23959

SUMMARY OF THE INVENTION

Subjects to be Solved

As described above, according to the PM emission amount estimation device disclosed in Patent Reference 1, the PM emission amount is computed by always multiplying the basic level of the PM emission amount by the correction factor computed by use of the data regarding the air excess ratio, regardless of whether the engine is placed in a steady operation condition or a transient operation condition.

Hence, the correction factor in the transient operation condition is not differentiated from the correction factor in the steady operation condition; thus, there is a problem that the correction factor in the transient operation condition is not accurately estimated or a problem that the pertinent correction in the transient operation condition cannot be expected.

Further, according to Patent Reference 1, the actual air excess ratio $r\lambda$ is computed based on the actual air flow rate and the actual fuel injection quantity; or, the actual air excess ratio $r\lambda$ is obtained by use of a sensor for detecting the air fuel ratio. It is questionable that the computed or detected actual air excess ratio is accurate enough to be used for computing the correction factor; namely, it is questionable that the computed correction factor is usable enough to accurately correct the basic level of the PM emission amount. In other words, it is difficult to obtain such accurate actual air excess ratio that can be used for computing the useable and appropriate correction factor in order to estimate the PM emission amount.

In view of the above-described problems or difficulties, the present invention aims at providing a PM emission estimation device for estimating the emission amount of the PM in the exhaust gas emitted from a diesel engine wherein the accuracy of the correction (i.e. the correction factor) in correcting the basic level of the PM emission amount by use of the PM emission amount estimation map can be enhanced; and, the PM emission amount particularly during the transient state of the engine operation condition can be accurately computed so as to estimate, with high precision, the PM emission amount and the PM emission accumulated-amount (integrated amount) during the whole engine operation conditions including the transient state as well as the steady state.

Means to Solve the Subjects

In order to overcome the problems or difficulties in the conventional technology, the present invention discloses a PM emission amount estimation device of a diesel engine provided with a DPF (Diesel Particulate Filter) collecting a PM (Particulate Matter) that is emitted from an exhaust gas passage of the engine, the PM emission amount estimation including, but not limited to:

- a PM emission amount estimation base-map with which a base PM emission amount is computed in response to an operating state of the engine;
- a PM emission amount estimation correction-device that determines a correction factor for correcting the base PM emission amount computed by the PM emission amount estimation base-map in response to a transient state of the engine;
- a transient state judgment device that judges that the engine is operated in the transient state based on a change of an air excess ratio regarding the engine; and
- a PM emission amount computation device that corrects the computed base PM emission amount by using the correction factor computed with the PM emission amount estimation correction-device only in a case where the transient state judgment device judges that the engine is in a transient operation condition, whereas the base PM emission amount is outputted in a case where the transient state judgment device judges that the engine is in a steady operation condition.

According to the above-described device of the present invention, it is judged whether the engine is in a transient operation condition or a steady operation condition; and, only when the engine is in a transient operation condition, the base PM emission amount computed by use of the PM emission amount estimation base-map is corrected by the correction factor. When the engine is in a steady operation condition, the base PM emission amount is used (i.e. outputted) as the PM emission amount without being processed. In this way, the PM emission amount can be accurately computed especially when the engine is in a transient operation condition. In other word, it becomes unnecessary that the correction factor be related to a wide range of the engine operation condition, the wide range including the steady state operation condition; thus, it becomes possible to introduce the parameters for reproducing the transient state in detail and to establish the correction factors with high accuracy by use of the parameters; thus, the PM emission amount in the transient operation condition of the engine can be computed with high accuracy.

Further, whether or not the engine is in the transient operation condition is judged by not the air excess ratio itself but the change of the air excess ratio; accordingly, the judgment can be performed so as to be not greatly influenced by the measured value itself or the computed value itself regarding the air excess ratio.

A preferable embodiment of the above-described present invention is the PM emission estimation device, wherein the transient state judgment device judges whether the engine is operated in a transient operation condition or a steady operation condition, in a manner that a current value of the air excess ratio is subtracted by a former value of the air excess ratio;

the subtracted value is divided by a measurement time interval;

the divided subtracted-value is passed through a first order lag low-pass filter so as to remove noise components; and, the judgment whether the engine is operated in a transient operation condition or a steady operation condition is judged by comparing the calculated value from which the noise is removed with a threshold value.

As described above, the divided subtracted-value is passed through a first order lag low-pass filter so that the noise components included in the value inputted in the filter is removed; thus, it can be accurately judged, on the basis that the influence of the noise signals on the deviations regarding the air fuel ratio measurement is removed, whether the engine is operated in a transient operation condition or a steady operation condition. Further, the computation regarding the air excess ratio can be performed only based on the current measurement value and the former measurement value; thus, the information data storage space regarding the transient state judgment device can be saved to a minimal level.

Another preferable embodiment of the above-described present invention is the PM emission estimation device, wherein the PM emission amount estimation correction-device is a PM emission amount estimation correction-map that is established as a function of at least the air excess ratio, the air excess ratio being related to the intake air supplied into a combustion chamber of the engine.

Further, another preferable embodiment of the above-described present invention is the PM emission estimation device, wherein the PM emission amount estimation correction-map is further established as a function of an engine speed and a fuel injection amount as well as the air excess ratio.

The PM emission amount estimation correction-map may be established based on the air fuel excess ratio; the correction-map may be established so that the correction factor may be expressed by a function of the base parameter (the engine operation state variable), the function being established by averaging the experiment data, as shown in FIG. 2.

The form of the function expressed with the relational parameters may be established by use of an approach of regression analyses regarding the measurement data obtained by the previously executed experiments so that the function is expressed in a form of a map; in this way, the optimal correction factors corresponding to the engine transient operation condition can be accurately determined.

Another preferable embodiment of the above-described present invention is the PM emission estimation device, wherein the PM emission amount estimation correction-map is further established as a function of an oxygen concentration regarding an air charged into a combustion chamber.

Since the PM is produced through the chemical reaction between the fuel and the oxygen in the suction air, the produced amount of the PM is tied closely to the oxygen concentration. Accordingly, when the oxygen concentration is added and included as one of the parameters expressing the function so that the PM emission amount estimation correction-map is established as a function of the parameters also including the oxygen concentration, the optimal correction factor suitably corresponding to the transient operation condition of the engine can be accurately computed.

As shown in FIG. 13, the experiments reveal that the PM emission amount steeply increases toward a peak level soon after the transient operation condition of the engine begins whereas the peak amount gradually decreases so as to return to the level of the basic PM emission amount.

Another preferable embodiment of the above-described present invention is the PM emission estimation device, the device including, but not limited to, a first order lag element that is capable of performing the first order lag operation for the input of the first order lag element and output the result of the first order lag operation, wherein the first order lag operation by use of the first order lag element is executed and the output result thereof is used as the correction factor in multiplying the basic PM emission amount by the correction factor in a case where the PM emission amount is decreasing toward negative direction, the correction factor before the execution of the first order lag being determined by use of the PM emission amount estimation correction-device; and, the correction factor inputted into the first order lag element is outputted through the first order lag element without the first order lag operation and the output from the first order lag element is used as the correction factor in multiplying the basic PM emission amount by the correction factor in a case where the PM emission amount is increasing toward positive direction, the correction factor inputted into the first order lag element being determined by use of the PM emission amount estimation correction-device.

As described above, the multiplication of the correction factor is performed so that the correction factor is compatible with the PM emission characteristics during the transient engine-operation condition; in this manner, the actual PM emission amount during the transient operation condition can be modeled and detailed with high accuracy.

Further, another preferable embodiment of the above-described present invention is the PM emission estimation device, wherein a time constant of the first order lag element is reduced as the correction factor becomes greater, the correction factor being determined by the PM emission amount estimation correction-device.

As described above, the actual PM emission amount during the transient operation condition can be modeled and detailed with high accuracy. Thus, the estimation regarding the PM emission amount during the transit operation condition can be realized with high accuracy.

In other words, as shown in FIG. 13, there is a PM emission tendency whereby, if the peak is high (cf. the part X in FIG. 13), then the return (convergence) of the PM emission amount toward the basic level is speedy in comparison with the case where the peak is low (cf. the part Y in FIG. 13) and the return (convergence) of the PM emission amount toward the basic level is slow. In order that the estimation manner is compatible with this tendency, when the peak is high and the correction factor is required to be great, the time constant $T_s$ is preferably reduced so that the to-be-estimated PM emission amount promptly converges to the steady PM emission amount level; on the other hand, when the peak is low and the correction factor may be small, the time constant $T_s$ is preferably increased so that the to-be-estimated PM emission amount gradually converges to the steady PM emission amount level. Thus, the correction factor can be determined with high accuracy, so that the correction factor is further compatible with the PM emission characteristics or the above-described tendency.

Effects of the Invention

According to the present invention, the PM emission amount estimation device includes, but not limited to:
- a PM emission amount estimation base-map with which the base PM emission amount is computed in response to the operation condition of the engine;
- a PM emission amount estimation correction-device that determines a correction factor for correcting the base PM emission amount computed by the PM emission amount estimation base-map, the correction factor being determined in response to the transient engine operation condition;
- a transient state judgment device that judges that the engine is operated in a transient operation condition based on the change of the air excess ratio regarding the engine;
- a PM emission amount computation device that corrects the computed base PM emission amount by multiplying the computed base PM emission amount by the correction factor computed with the PM emission amount estimation correction-device (map) only in a case where it is judged, by the transient state judgment device, that the engine is in a transient operation condition whereas the base PM emission amount is directly outputted in a case where it is judged that the engine is in a steady operation condition.

Hence, according to the present invention, it is judged whether or not the engine is in a transient operation condition; and, only when the engine is in a transient operation condition, the base PM emission amount computed by use of the PM emission amount estimation base-map is corrected by the correction factor. Thus, the PM emission amount during the transit engine operation condition can be accurately computed. Thus, the PM emission amount and the PM emission accumulated-amount (integrated amount) during the whole engine operation conditions including the transient state as well as the steady state can be estimated with high accuracy. In this way, the PM emission amount estimation device according to the present invention can be realized.

BRIEF DESCRIPTION OF THE DRAWINGS

FIG. 5(a) is a diagram (a comparison between actual measurements and estimation levels) regarding the PM emission amount (accumulated amount) in a case where the judgment threshold is established at a smaller level;

FIG. 5(b) is a diagram (a comparison between actual measurements and estimation levels) regarding the PM emission amount (accumulated amount) in a case where the judgment threshold is established at a greater level;

FIG. 5(c) is a diagram (a comparison between actual measurements and estimation levels) regarding the PM emission amount (accumulated amount) in a case where the judgment threshold is established at an optimal level;

DETAILED DESCRIPTION OF THE PREFERRED MODES

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

(First Mode)

Figure 1:
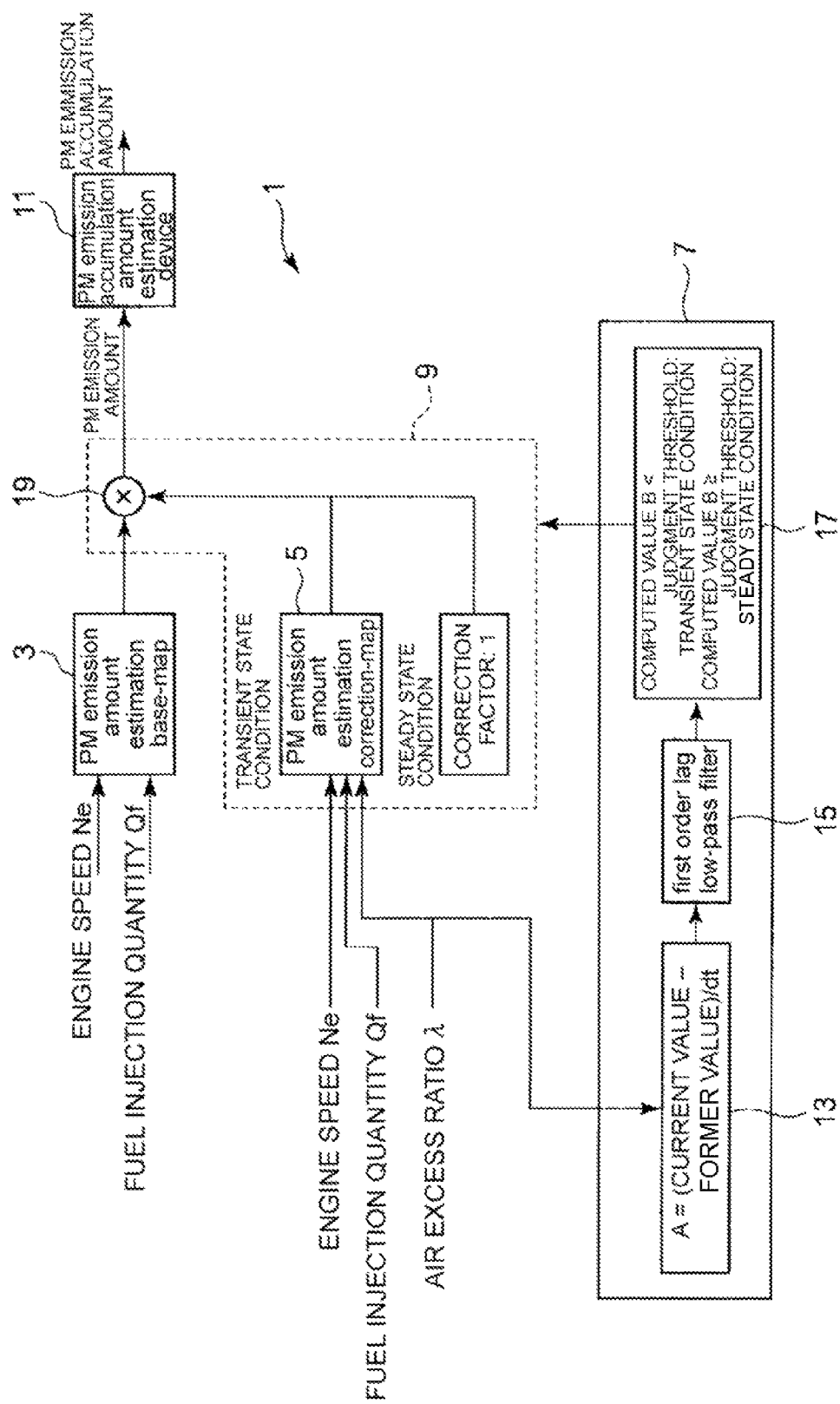
FIG. 1 shows a whole configuration of the device according to a first mode of the present invention.

Based on FIGS. 1, 2, 3, 4, 5(a), 5(b), 5(c) and 6, the first mode of the present invention is now explained. In FIG. 1, the numeral 1 denotes a PM emission amount estimation device for estimating the amount of the PM (Particulate Matter) that is emitted from a diesel engine and accumulated in a DPF (Diesel Particulate Filter) provided in the exhaust gas passage of a diesel engine (not shown); the PM emission amount estimation device 1 estimates the PM emission amount collected by the DPF and the PM emission accumulation amount accumulated in the DPF.

The PM emission amount estimation device 1 includes, but not limited to:

a PM emission amount estimation base-map 3 with which the base PM emission amount is computed when the engine is in a steady the operation condition;

a PM emission amount estimation correction-map 5 that determines a correction factor for correcting the base PM emission amount computed by the PM emission amount estimation base-map 3, the correction factor being determined in response to the transient engine operation condition;

a transient state judgment device 7 that judges that the engine is operated in a transient operation condition, based on the change of the air excess ratio regarding the engine;

a PM emission amount computation device that corrects the computed base PM emission amount by multiplying the computed base PM emission amount by the correction factor computed with the PM emission amount estimation correction-device (map) only in a case where it is judged, by the transient state judgment device, that the engine is in a transient operation condition whereas the base PM emission amount is directly outputted in a case where it is judged that the engine is in a steady operation condition; and, a PM emission accumulation amount estimation device 11 that performs the integration regarding the accumulation of the PM emission amount computed by the PM emission amount computation device 9, the accumulation being the PM accumulation amount collected by and accumulated in the DPF.

At first, the PM emission amount as a function with regard to the engine speed Ne and the fuel injection quantity Qf is experimentally expressed in advance, the PM emission amount being related to the steady engine operation condition. Based on the experiment results, the PM emission amount estimation base-map 3 is previously established. By use of this PM emission amount estimation base-map 3, the basic PM emission amount is computed every sampling time interval, according to the engine speed Ne and the fuel injection quantity Qf.

Figure 2:
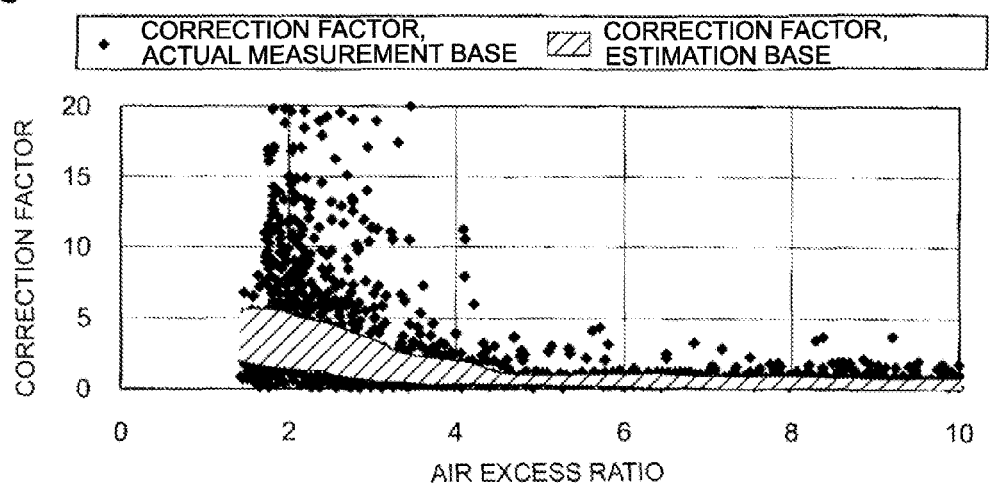
FIG. 2 is a diagram showing actual measurements, the correction factors regarding PM estimation being determined based on the measurement results.
Figure 3:
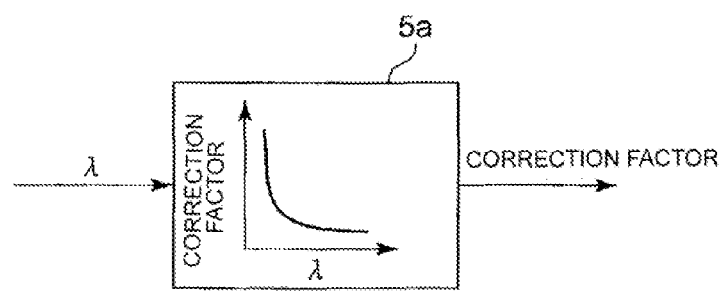
FIG. 3 shows an example of the map used for estimating the PM emission amount, the map being formed according to the first mode of the present invention.

The PM emission amount estimation correction-map 5 is a map to compute the correction factor; for instance, as shown in FIG. 2, the appropriate correction factor is experimentally determined in advance, with regard to the air excess ratio $\lambda$. The experimental measurement data are plotted in FIG. 2 where the lateral axis denotes the air excess ratio $\lambda$ and the vertical axis denotes the correction factor. Regression analyses are performed in relation to the measurement data so that the correction factor is determined as an approximation function with regard to the air fuel ratio $\lambda$. In this way, the PM emission amount estimation correction map 5 is established as a map of the approximation function. An exemplar PM emission amount estimation correction-map 5$a$ is shown in FIG. 3. As described in FIG. 3, the correction factor may be established simply with regard to the air excess ratio $\lambda$.

Further, the PM emission amount estimation correction map 5 can be established as a multivariable function with regard to the parameters of not only the air excess ratio $\lambda$ but also the engine speed Ne and the fuel injection quantity Qf.

Also in this event, the appropriate correction factor is experimentally determined in advance, with regard to the air excess ratio $\lambda$, the engine speed Ne and the fuel injection quantity Qf. Multiple regression analyses are performed in relation to the measurement data so that the correction factor is determined as an approximation function with regard to the parameters of the air fuel ratio $\lambda$, the engine speed Ne and the fuel injection quantity Qf.

Figure 4:
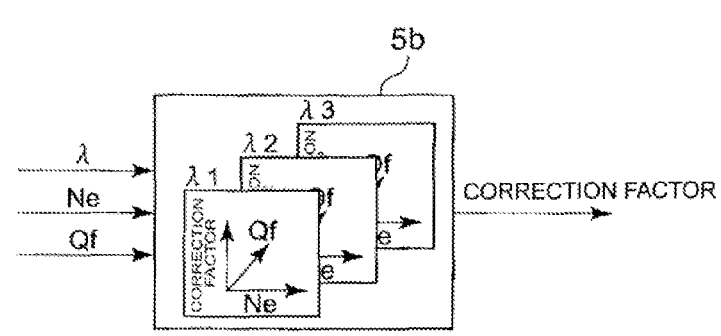
FIG. 4 shows another example of the map used for estimating the PM emission amount, the map being formed according to the first mode of the present invention.

For instance, a correction factor $\alpha 1$ is set as an approximation function such as $\alpha 1 = a_1 + a_2 \, \text{Ne (rpm)} + a_3 \, \text{Qf (g/sec)} + a_4 \lambda$. An exemplar PM emission amount estimation correction map 5$b$ prepared in this way is shown in FIG. 4. The PM emission amount estimation correction map 5$b$ is configured with a plurality of correction maps in response to a plurality of $\lambda$-levels (e.g. $\lambda_1$, $\lambda_2$ and $\lambda_3$,) regarding the air excess ratio $\lambda$; in establishing the correction factor, one of the correction maps is selected in response to the air excess ratio (reflecting the engine operation condition) so that the correction factor is determined.

The transient state judgment device 7 includes, but not limited to:

a computing section 13 that computes a value (a differential coefficient) that is (the current air excess ratio measurement value—the former air excess ratio measurement value)/dt, the term dt being a data sampling period;

a first order lag low-pass filter 15 that removes the noise components included in the value (the differential coefficient) inputted in the filter; and, a judgment section 17 that judges whether or not the computed value (the differential coefficient) from which the noise components are removed is greater than or equal to a threshold value.

In the computing section 13, the air excess ratio $\lambda$ is computed, based on the suction air flow rate Qa and the fuel injection flow rate Qf, by use of a calculation formula, $\lambda = $(the suction air flow rate Qa)/(the fuel injection flow rate Qf$\times$14.4) every sampling time of, for example, 20 m-sec; and, the time series data of computed values regarding the air excess ratio are generated. In addition, the air excess ratio $\lambda$ may be sought based on an air fuel ratio sensor instead of the calculation formula.

In the first order lag low-pass filter 15, the noise components included in the time series data of the air excess ratio are removed, the data being computed in the computing section 13. Thus, in computing the air fuel ratio $\lambda$, the influence of the errors due to noise signals contained in the measured data regarding the suction air flow rate Qa and the fuel injection flow rate Qf can be removed.

In the judgment section 17, it is judged whether or not the computed value (the differential coefficient) is greater than or equal to a judgment threshold value; it is judged that the engine is in a transient operation condition in a case where the computed value (the differential coefficient) is smaller than a judgment threshold, whereas it is judged that the engine is in a steady operation condition in a case where the computed value (the differential coefficient) is greater than or equal to the judgment threshold. The judgment threshold in the judgment section 17 is determined so that the measured value of the PM emission accumulation amount and the estimation value (calculated by use of the map) agree with each other in the elapsed time as shown in FIG. 5(C) out of FIGS. 5(A), 5(B) and 5(C). In other words, the judgment threshold in the judgment section 17 is determined so that the line L0 of the measured PM emission accumulation amount almost agrees with the line L3 of the estimated PM emission accumulation amount as shown in FIG. 5(C).

Figure 5A:
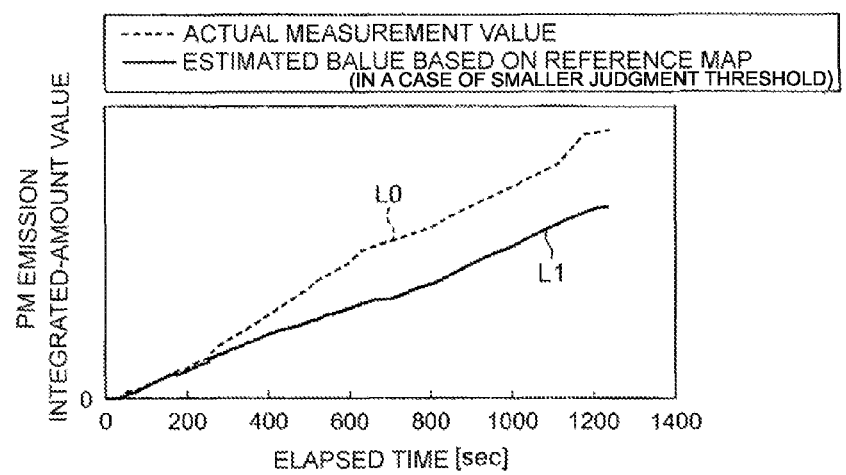
FIGS. 5(a), 5(b) and 5(c) are used for explaining the procedures regarding how the judgment threshold is established.

FIG. 5(A) explains the trend of the measured PM emission accumulation amount as well as the estimated PM emission accumulation amount in a case where a smaller judgment threshold (in the judgment section 17) is assumed. Thereby, it is judged that the engine is operated almost in a steady operation condition; thus, the data correction by use of the PM emission amount estimation correction-map 5 is not performed, and the PM emission amount is computed simply by use of the PM emission amount estimation base-map 3. Thus, the trend of the PM emission accumulation amount obtained by use of the PM emission accumulation amount estimation device 11 is depicted with the line L1; and, the line L1 drifts away from the line L0 of the actual measurement trend.

Figure 5B:
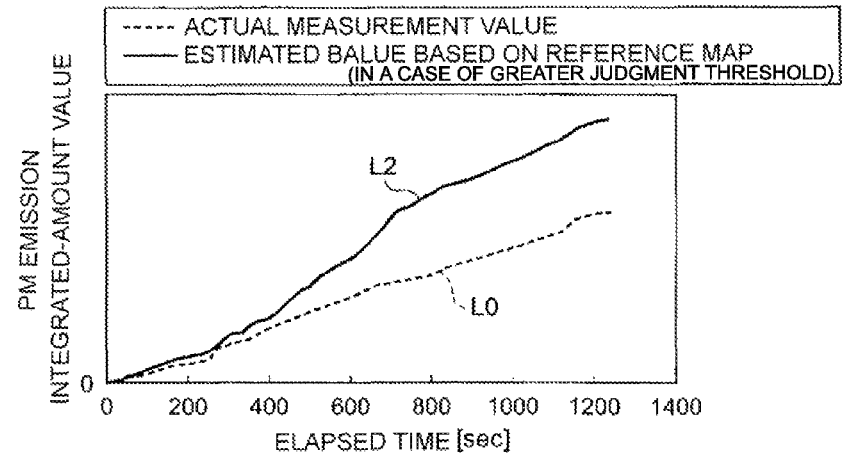
Figure 5C:
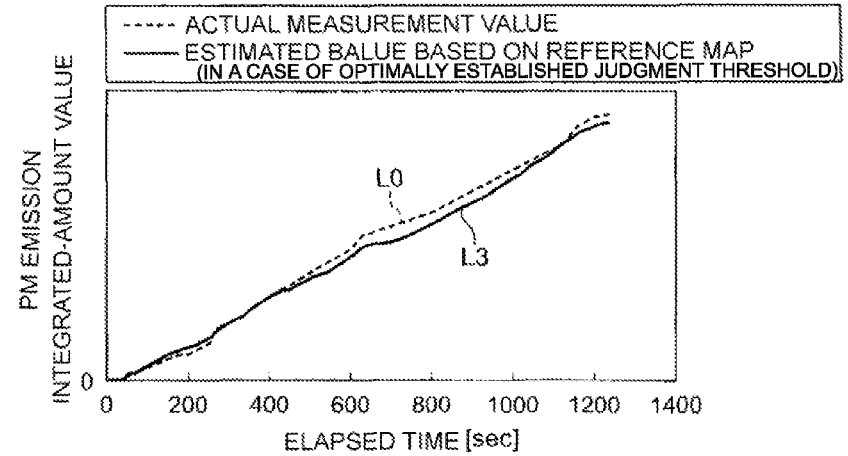

FIG. 5(B) explains the trend of the measured PM emission accumulation amount as well as the estimated PM emission accumulation amount in a case where a greater judgment threshold (in the judgment section 17) is assumed. Thereby, it is judged that the engine is operated almost in a transient operation condition; thus, the data correction by use of the PM emission amount estimation correction-map 5 is not performed, and the PM emission amount is computed simply by use of the PM emission amount estimation base-map 3. Thus, the trend of the PM emission accumulation amount obtained by use of the PM emission accumulation amount estimation device 11 is depicted with the line L2; and, the line L2 drifts away from the line L0 of the actual measurement trend.

From the reasons as described above, it becomes desirable that a judgment threshold (in the judgment section 17) is appropriately set so that the measured value of the PM emission accumulation amount and the estimation value (calculated by use of the map) agree with each other in the elapsed time as shown in FIG. 5(C); namely, a judgment threshold corresponding to the line L3 in FIG. 5(C) is searched with a graphic approach so that the to-be-sought threshold is between the threshold corresponding to L1 and the threshold corresponding to L2, and the line L3 in response to the to-be-sought threshold mostly agrees with the line L0 of the actual PM emission accumulation amount. To be more specific, for instance, a sufficiently great threshold value is assumed at first; the assumed threshold value is decreased step by step; when the condition that the estimated PM emission accumulation amount is smaller than the actual PM emission accumulation amount changes into the condition that the estimated PM emission accumulation amount is greater than or equal to the actual PM emission accumulation amount, then the assumed threshold value is increased. In this way, the range in which an appropriate judgment threshold exists is gradually limited to a narrow range; and, the optimal judgment threshold value to be sought is appropriately determined.

In a case where the transient state judgment device 7 judges that the engine is in a transient operation condition, the PM emission amount computation device 9 outputs the correction factor (greater than 1) obtained by use of the PM emission amount estimation correction-map 5 toward a multiplier 19 (as shown in FIG. 1). And, the basic PM emission amount computed by use of the PM emission amount estimation base-map 3 is multiplied by the correction factor. The basic PM emission amount multiplied by the correction factor is outputted as the PM emission amount. In a case where the transient state judgment device 7 judges that the engine is in a steady operation condition, the correction factor of 1 is inputted into the multiplier 19; the basic PM emission amount is simply outputted (from the PM emission amount computation device 9).

The PM emission amount that is computed in the PM emission amount computation device 9 and outputted from the PM emission amount computation device 9 is integrated by the PM emission accumulation amount estimation device 11; thus, the PM emission accumulation amount that is accumulated in the DPF is estimated. Based on the result of this estimation, the regeneration (e.g. maintenance reheating) of the DPF is executed.

Figure 6:
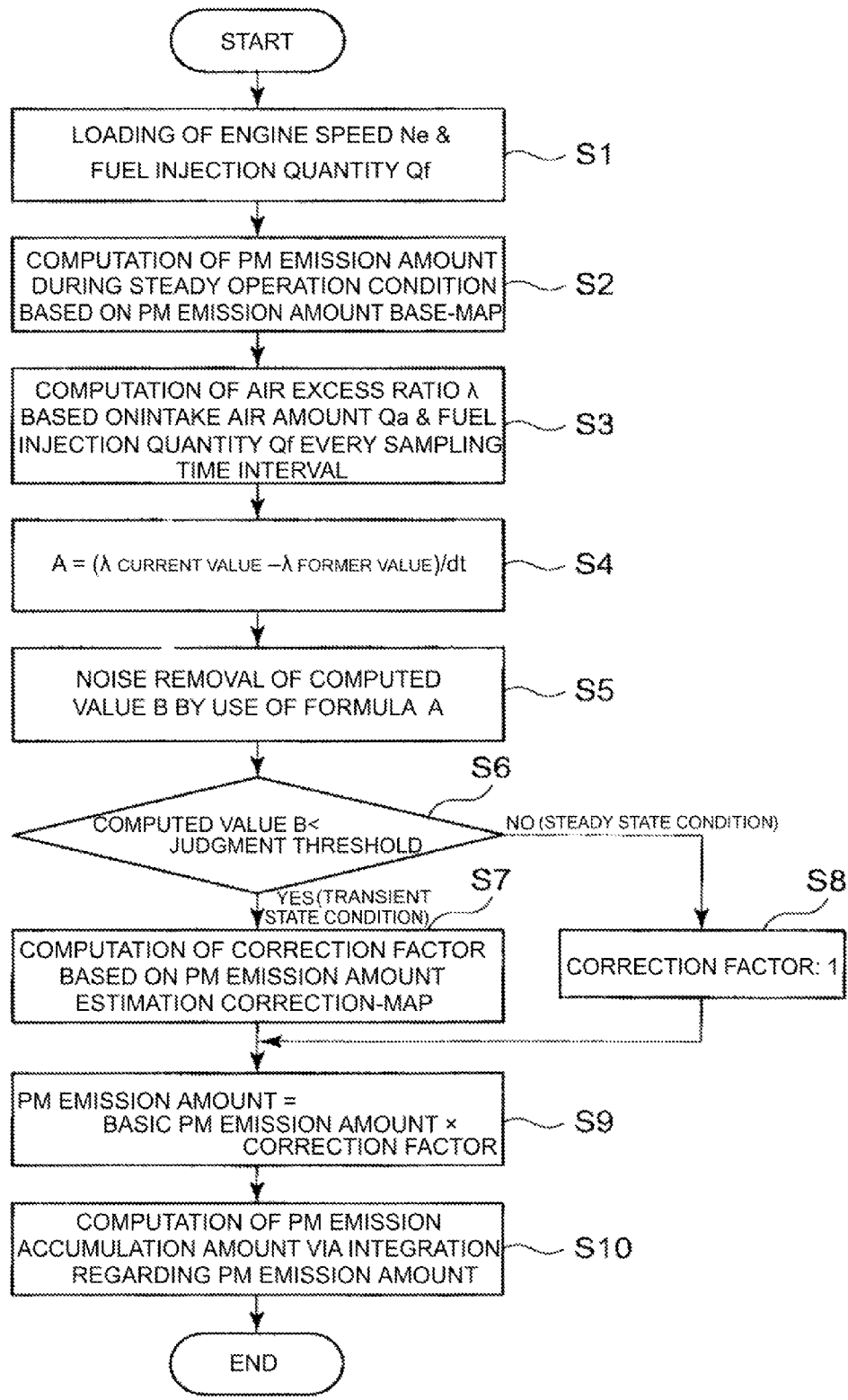
FIG. 6 is a flow chart showing the procedures regarding how the PM emission amount as well as the PM emission accumulation amount is estimated according to the first mode of the present invention.

In the next place, based on the flow chart depicted in FIG. 6, the estimation processes regarding the PM emission accumulation amount is explained, the processes being performed by the PM emission amount estimation device 1.

At first, in the step S1, the engine speed Ne and the fuel injection quantity Qf are loaded every sampling period (e.g. per 20 m-sec); the step S1 is followed by the step S2 where, by use of the PM emission amount estimation base-map 3, the PM emission amount in a case of the engine steady condition is computed with regard to the detected engine speed Ne and the detected fuel injection quantity Qf.

The step S2 is followed by the step S3 where the air excess ratio $\lambda$ is computed, every sampling period, based on the suction air flow rate Qa and the fuel injection quantity (i.e. the fuel injection flow rate) Qf.

In the following step S4, the computing section 13 computes the value B (the differential coefficient) by use of a formula A: B=(the current air excess ratio measurement value−the former air excess ratio measurement value)/dt, wherein the term dt is a data sampling period.

The step S4 is followed by the step S5 where the first order lag low-pass filter 15 removes the noise components from the value B (the differential coefficient) computed by use of the formula A.

In the following step S6, it is judged whether or not the computed value B is smaller than the judgment threshold; when the value B is smaller than the threshold value, it is judged that the engine is in a transient operation condition and the step S6 is followed by the step S7 where the correction factor is computed based on the PM emission amount estimation correction-map 5. Hereby, in computing the correction factor by use of the PM emission amount estimation correction-map 5, the correction factor is obtained by use of the air excess ratio $\lambda$ that is computed in the step S3, in a case where the PM emission amount estimation correction-map 5 is established as a function of the air excess ratio $\lambda$; or, the correction factor is obtained by use of the detected values that is computed in the steps S1 and S3, in a case where the PM emission amount estimation correction-map 5 is established as a function of the air excess ratio $\lambda$, the engine speed Ne and the fuel injection quantity Qf.

When the computed value B is greater than or equal to the threshold value, it is judged that the engine is in a steady operation condition and the correction factor is set at 1 in the step S8. After the correction factor for a transient operation condition is computed in the step S7 or the correction factor for a steady operation condition is computed in the step S8, the step S7 or the step S8 is followed by the step S9 where the basic PM emission amount is multiplied by the correction factor based on the PM emission amount estimation base-map so as to determine the PM emission amount. In the following step S10, the determined PM emission amount is integrated so as to determine the PM emission accumulation amount, and a process flow finishes at the step S10.

According to the first mode of the present invention, based on the change of the air excess ratio $\lambda$, it is judged whether the engine is in a transient operation condition or in a steady operation condition; only while the engine is in a transient operation condition, the correction is performed by use of the correction factor; on the other hand, while the engine is in a steady operation condition, the basic PM emission amount itself is outputted as the PM emission amount. Thus, the PM emission amount can be accurately determined especially while the engine is in a transient operation condition. In other words, it becomes unnecessary to establish the correction factor so that the correction factor is compatible with the wide range of the engine operation state including the steady operation condition. Hence, it becomes possible to utilize the accurate correction factor that is capable of modeling and detailing the PM emission amount during the transient operation condition; and, the PM emission amount during the transient operation condition can be determined with high accuracy.

Further, whether a transient operation condition or a steady operation condition is judged based on the changing situation of the air excess ratio $\lambda$, namely, based on the formula A (i.e. the differential coefficient); the to-be-determined value (regarding the air excess ratio) is not influenced by a measurement figure itself or a computed figure itself regarding the air fuel ratio. In this way, whether a transient operation condition or a steady operation condition is appropriately judged.

Further, as shown in FIG. 2, the PM emission amount estimation correction-map 5 is established as a function that expresses the average coverage regarding the measurement results, the function being established by use of regression analyses based on the experiment data regarding the air excess ratio; further, the function may be established as a multi-variable function whereby the parameters such as the engine speed and the fuel injection quantity are included in the multi-variables; thus, the appropriate correction factor that is compatible to the transient operation condition can be established.

Further, in the transient state judgment device 13, the first order lag low-pass filter 15 removes the noise components from the computed value B; thus, on the basis that the influence of the noise signals on the deviations regarding the air fuel ratio measurement is removed, it can be accurately judged whether the engine is operated in a transient operation condition or a steady operation condition. Accordingly, the information data storage space regarding the transient state judgment device 13 can be saved to a minimal level.

(Second Mode)

Figure 7:
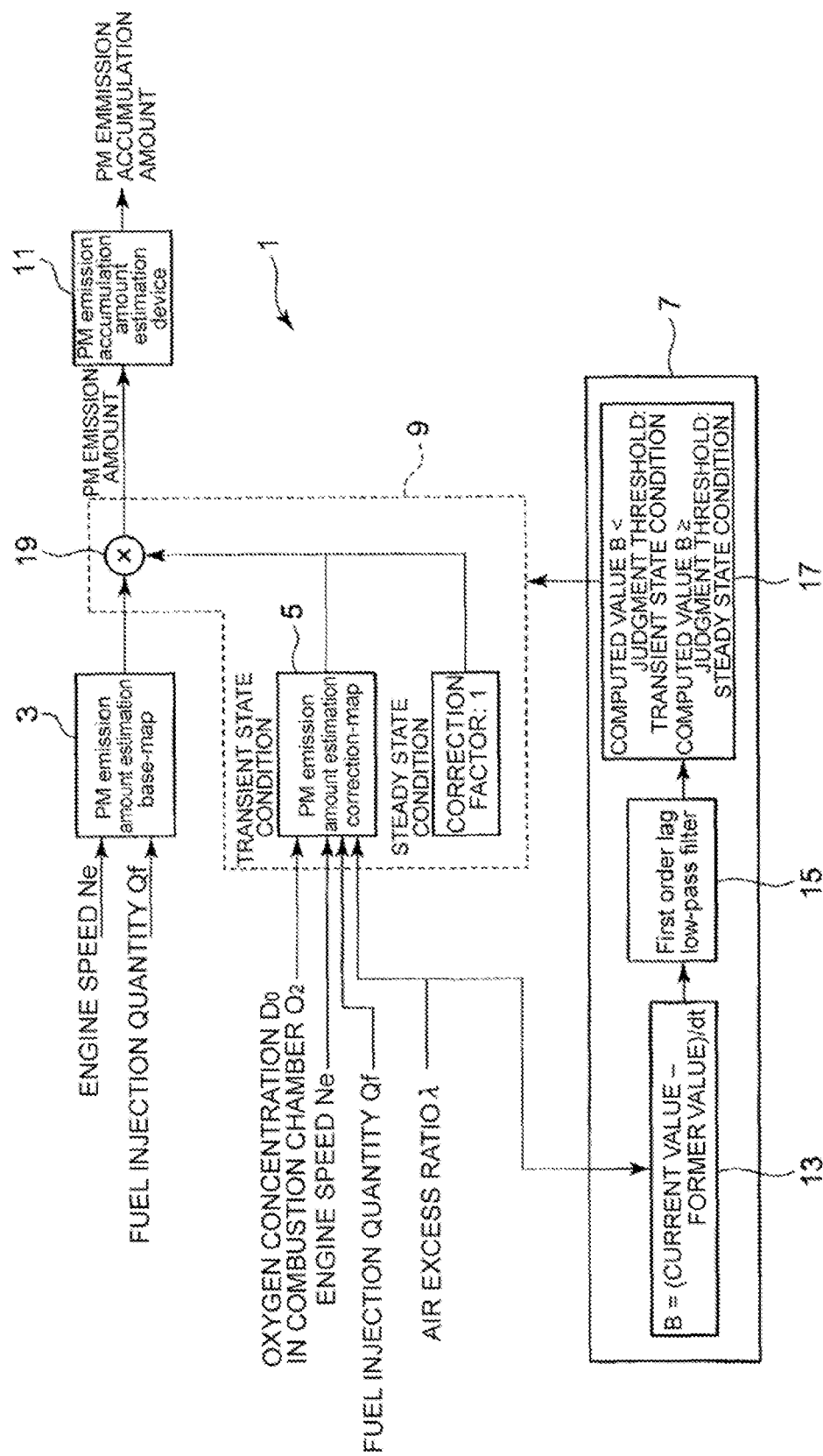
FIG. 7 shows a whole configuration of the device according to a second mode of the present invention.
Figure 8:
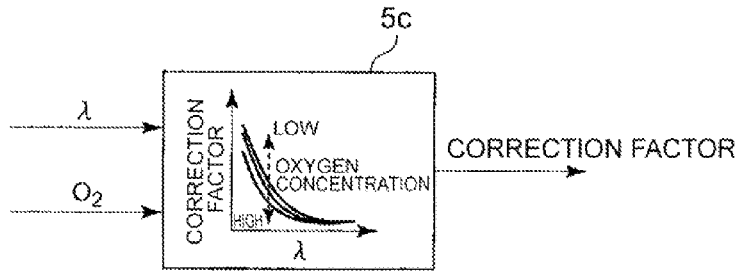
FIG. 8 shows an example of the map used for estimating the PM emission amount, the map being formed according to the second mode of the present invention.
Figure 9:
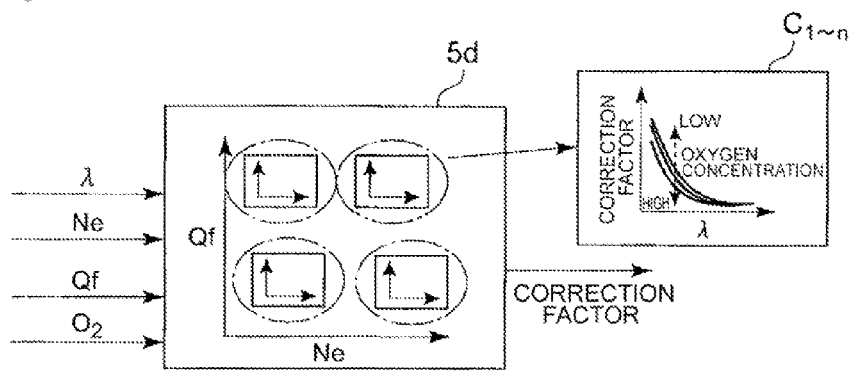
FIG. 9 shows another example of the map used for estimating the PM emission amount, the map being formed according to the second mode of the present invention.

In the next place, based on FIGS. 7 to 9, a second mode of the present invention is now explained. As shown in FIG. 7, in this second mode, the oxygen concentration $D_0$ of the air-fuel mixture (the intake-air-fuel mixture or the suction-air-fuel mixture) charged into the combustion chamber is adopted as a parameter for forming the PM emission amount estimation correction-map 5, in addition to the parameters such as the engine speed Ne and the detected fuel injection quantity Qf. The oxygen concentration $D_0$ can be detected, for instance, by an oxygen concentration sensor provided just before the combustion chamber in the air intake passage in which the air streams toward the combustion chamber.

FIG. 8 shows an example of a PM emission amount estimation correction-map 5c according to the second mode; thereby, the air excess ratio $\lambda$ and the oxygen concentration $D_0$ configure the parameters of the correction-map 5c. The produced amount of the PM is tied closely to the oxygen concentration. When the oxygen concentration is at a high level, the PM emission amount generally decreases; on the other hand, when the oxygen concentration is at a low level, the PM emission amount generally increases. Hence, by adopting the oxygen concentration as one of the parameters for expressing the PM emission amount estimation correction-map, the estimation of the produced PM amount (as well as the PM accumulation amount) can correspond precisely with the real conditions of the actually produced PM amount. In this way, the estimation accuracy regarding the PM emission amount can be enhanced.

Further, the PM emission amount estimation correction map 5 can be expressed as a multivariable function with regard to the parameters: the air excess ratio $\lambda$, the engine speed Ne, the fuel injection quantity Qf and the oxygen concentration $D_0$; and, the correction factor can be suitably established so that the transient engine operation condition is properly reflected on the correction factor.

Also in this event, the appropriate correction factor is experimentally determined in advance, with regard to the air excess ratio $\lambda$, the engine speed Ne, the fuel injection quantity Qf and the oxygen concentration $D_0$. Multiple regression analyses are performed in relation to the measurement data so that the correction factor is determined as an approximation function with regard to these parameters.

For instance, a correction factor $\alpha 2$ is set as an approximation function such as $\alpha 2 = a_1 + a_2 Ne(rpm) + a_3 Qf(g/sec) + a_4 \lambda + a_5 D_0$. An exemplar PM emission amount estimation correction map 5d prepared in this way is shown in FIG. 9. The PM emission amount estimation correction map 5d includes a plurality of sub-maps $C_1$ to $C_n$; each sub-map corresponds to a sub-region of the region which two parameters, namely, the engine speed Ne and the fuel injection quantity Qf form. In other words, a 2-dimension region regarding the parameters Ne and Qf is divided into includes n sub-regions regarding the parameters Ne and Qf; and each sub-region corresponds to one of the sub-maps $C_1$ to $C_n$. In each sub-region corresponding to one the sub-maps $C_1$ to $C_n$, for instance, the lateral axis of the sub-region denotes the air excess ratio $\lambda$, whereas the vertical axis denotes the correction factor. Further, in each one of the sub-maps $C_1$ to $C_n$, a plurality of correction-factor-$\lambda$ curves are provided in response to a plurality of $D_0$ values (oxygen concentration values); thus, in each one of the sub-maps $C_1$ to $C_n$, the correction factor is established based on a $\lambda$-value (i.e. an air excess value) and a $D_0$-value (i.e. a function curve of the oxygen concentration).

As described above, the PM emission amount estimation correction map 5d is formed with the parameters: the air excess ratio $\lambda$, the engine speed Ne, the fuel injection quantity Qf and the oxygen concentration $D_0$; thus, the emission accumulation amount is further accurately estimated.

(Third Mode)

Figure 10:
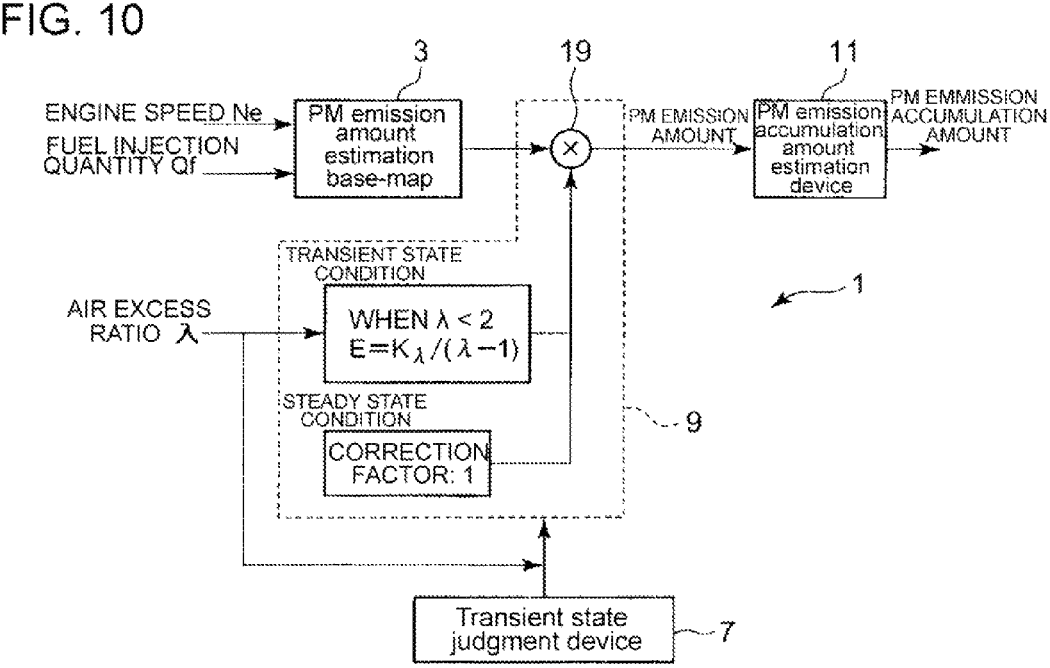
FIG. 10 shows a whole configuration of the device according to a third mode of the present invention.

In the next place, based on FIG. 10, a third mode of the present invention is now explained. In this third mode, the correction factor for correcting the basic PM emission amount during the transient engine-operation condition is not determined by use of the PM emission amount estimation correction-map 5 that is used in the case of the first and the second mode; but, in this event, the correction factor for correcting the basic PM emission amount during the transient engine-operation condition is determined by use of a formula called a transient gain formula that is derived from the fuel air ratio $\lambda$. As shown in FIG. 10, when the transient state judgment device 7 judges, based on the air excess ratio $\lambda$, that the engine is in a transient operation condition, and when the air excess ratio $\lambda$ is smaller than 2, then the correction factor is set by the transient gain formula E that is concretely expressed in an expression that $E = K_\lambda/(\lambda - 1)$, whereby the term $K_\lambda$ is a multiplier (a multiplication number) for determining correction factors. Incidentally, when the transient state judgment device 7 judges that the engine is in a transient operation condition, the correction factor is set at 1 as is the case with the first and second modes.

According to the third mode of the present invention, when it is judged that the engine is in a transient operation condition, and the air excess ratio $\lambda$ is smaller than 2, the correction factor is determined by use of the transient gain formula E. Thus, differently from the case of the first mode or the second mode, it becomes unnecessary to configure the PM emission amount estimation correction-map 5. Hence, the estimation process for estimating the PM emission accumulation amount can be simplified.

(Fourth Mode)

Figure 11:
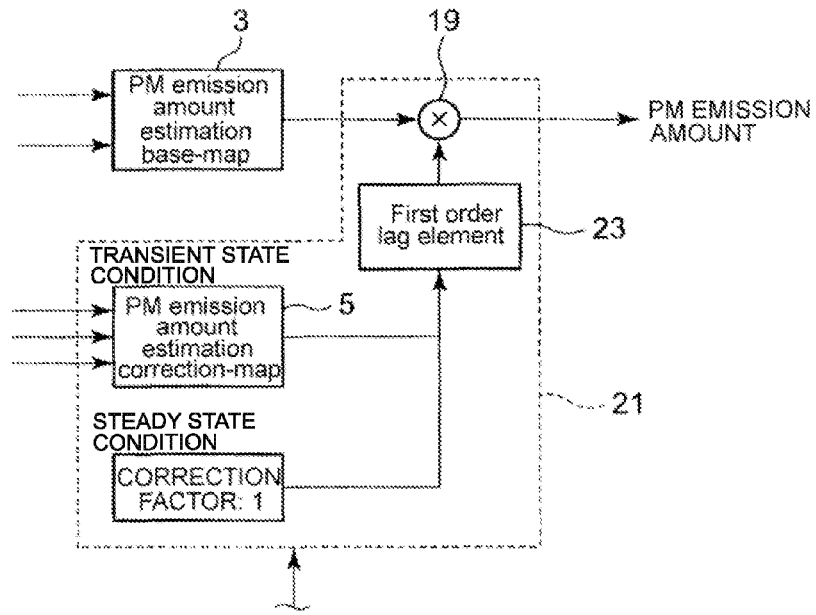
FIG. 11 shows a part of the configuration of the device according to a fourth mode of the present invention.
Figure 12:
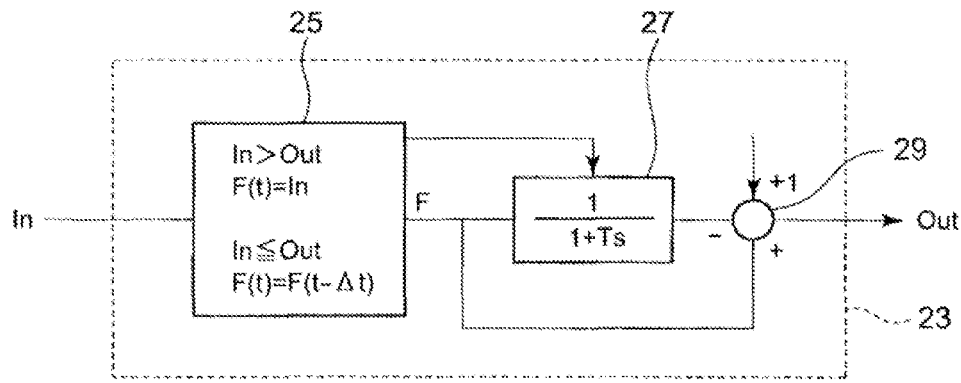
FIG. 12 shows a block diagram of a first order lag element, the block diagram being used in the fourth mode of the present invention.
Figure 13:
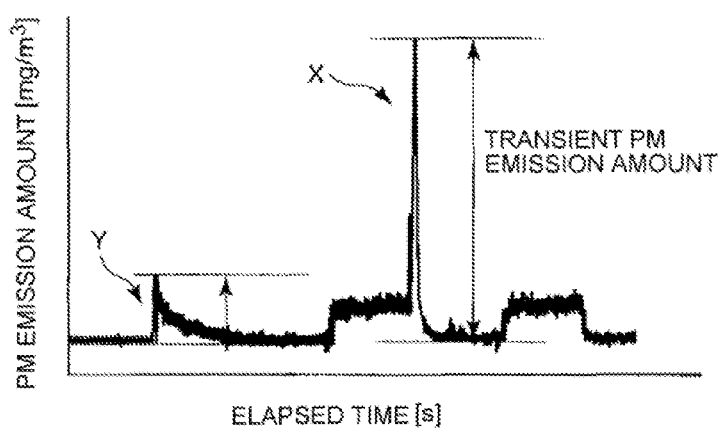
FIG. 13 explains the characteristics regarding the PM emission amount emitted during from the engine in operating condition of a transient state; and, FIG. 14 shows a whole configuration of the PM emission-amount estimation-device according to the conventional technology.
Figure 14:
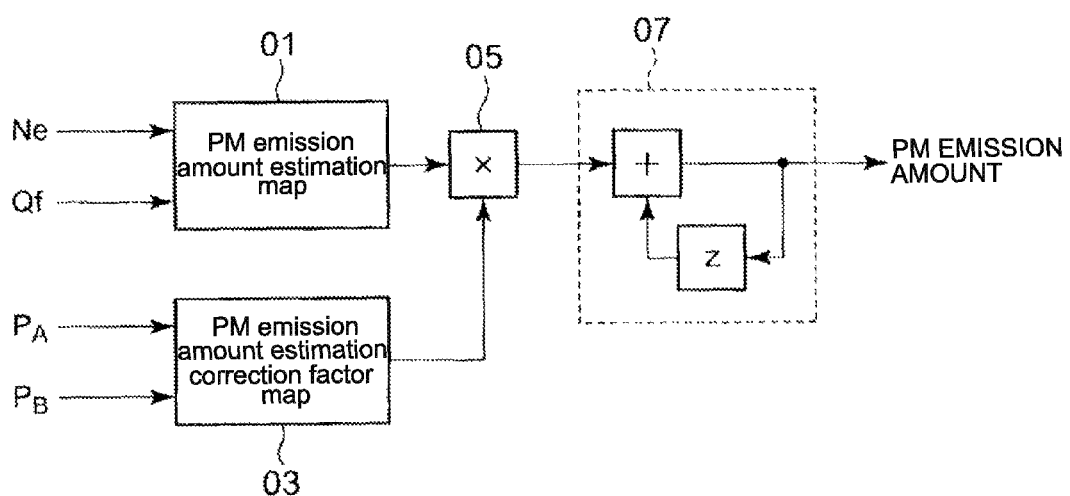

In the next place, based on FIGS. 11 to 13, a fourth mode of the present invention is now explained. As shown in FIG. 11, in this fourth mode, the signal to be inputted into the multiplier 19 in a PM emission amount computation device 21 is passed through a first order lag element 23 just before the signal is inputted into the multiplier 19. In this way, the first order lag element 23 is additionally provided in this fourth mode. Incidentally, the same configuration components in the fourth mode as in the first mode are given common numerals; and, explanation repetitions are omitted.

As shown in FIG. 13, the experiments reveal that the PM emission amount steeply increases toward a peak level soon after the transient operation condition of the engine begins whereas the peak amount gradually decreases so as to return to the level of the basic PM emission amount. The multiplication of the correction factor is performed so that the correction factor is compatible with the PM emission characteristics during the transient engine-operation condition; in this manner, the actual PM emission amount during the transient operation condition can be modeled and detailed with high accuracy. Thus, the accurate estimation regarding the PM emission amount can be realized.

The first order lag element 23 is provided to control the output signal so that the output signal corresponds to the tendency of the actual PM emission amount, the tendency meaning that the PM emission amount steeply increases toward a peak level soon after the transient operation condition of the engine begins whereas the peak amount gradually decreases so as to return to the level of the basic PM emission amount. As shown in FIG. 12, the first order lag element 23 includes, but not limited to, a signal evaluation section 25, a time constant block section (a time constant computing section) 27 and an adder-subtractor 29; when the PM emission amount is in an increasing mode (i.e. while the time differential coefficient of the amount is positive), the first order lag element 23 outputs the input value as the output value; on the other hand, when the PM emission amount is in a decreasing mode (i.e. while the time differential coefficient of the amount is negative), the first order lag element 23 outputs the first lag calculation result of the former input value as the output value.

The signal evaluation section 25 judges whether or not the input signal value IN of the first order lag element 23 is smaller than the output signal value OUT of the first order lag element 23; in a case where IN>OUT (namely, when the PM emission amount is in an increasing mode), the output signal F(t) of the signal evaluation section 25 is set so that F(t)=IN, namely, the output signal F is renewed. Thus, when the output signal value F is renewed, the time constant block section 27 is reset so as to revise the time constant value and perform the first lag calculation for the renewed F; then, in the adder-subtractor 29, the signal value F is added by a constant 1 and the output OUT of the first order lag element 23 is obtained (i.e. OUT=F+1).

Further, in the signal evaluation section 25, when it is judged that IN≤OUT (namely, when the PM emission amount is in a decreasing mode), F(t) is set as F(t−Δt), namely, F(t)=F(t−Δt); thus, the output signal F is not renewed. In other words, the value of F at the former time point (t−Δt) is the same as the value of F at the current time point (t). Further, time differential coefficient (such as A as described above) regarding the signal value F is not renewed; thus, the time constant is not renewed in the time constant block section 27. Then, in the adder-subtractor 29, the signal value F (that is the same as the value F at the former time point) is subtracted by the time constant added by a constant 1 and the output OUT of the first order lag element 23 is obtained.

Incidentally, the reason why a constant 1 is added in the adder-subtractor is that the coefficient factor is prevented from becoming 0, when the basic PM emission amount is multiplied by the coefficient factor based on the PM emission amount estimation base-map; namely, the constant 1 is provided for the convenience of the calculation processes.

Further, it is preferable that the computed time constant $T_s$ is modified in response to the input signal value F or the magnitude of the air excess ratio. For instance, as the air excess ratio becomes smaller, the time constant may be reduced. As shown in FIG. 13, when the PM emission amount steeply increases toward a peak level soon after the transient operation condition of the engine begins whereas the peak amount gradually decreases so as to return to the level of the basic PM emission amount; thereby, if the peak is high (cf. the part X in FIG. 13), then the return of the PM emission amount toward the basic level is speedy in comparison with the case where the peak is low (cf. the part Y in FIG. 13) and the return of the PM emission amount toward the basic level is slow. In a case where the time constant is modified so that, as the air excess ratio becomes smaller, the time constant is preferably reduced, the output of the PM emission amount computation device can further accurately simulates and estimates the actual PM emission amount transition in view of the above-described speediness or slowness tendency regarding the return transition of the PM emission amount toward the basic level.

As described in the first mode (FIG. 2), in the relationship between the air excess ratio and the correction factor, as the air excess ratio decreases, the correction factor is inclined to increase. Thus, it is preferable that the computed time constant $T_s$ is modified in response to the magnitude of the correction factor. For instance, as the correction factor becomes greater, the time constant $T_s$ may be reduced.

Hence, the correction factor is set at a greater level in response to the high peak of the actual PM emission amount transition, and the PM emission estimation can be promptly converged to the basic level as shown in FIG. 13; the correction factor is set at a lower level in response to the low peak of the actual PM emission amount transition, and the PM emission estimation can be gradually converged to the basic level as shown in FIG. 13. In this way, the output of the PM emission amount computation device can further accurately simulate and estimate the actual PM emission amount transition in the transient engine operation condition. Thus, the accuracy of the PM emission amount computed by use of the correction factor that is determined by means of the PM emission amount estimation base-map 3 can be enhanced.

As described above, according to the fourth mode of the present invention, the multiplication by use of the correction factor in response to the characteristic of the PM emission amount during the transit engine operation condition can be performed; thus, the transition regarding the actual PM emission amount during the transit engine operation condition can be estimated and followed with high accuracy.

INDUSTRIAL APPLICABILITY

According to the present invention, it is judged whether the engine is in a transient operation condition or a steady operation condition based on the change of the air excess ratio; and, only while the engine is in a transient operation condition, the correction of the basic PM emission amount into the estimated PM emission amount by the correction factor multiplication by use of the PM emission amount estimation correction-map is performed so that the PM emission amount particularly during the transient state of the engine operation condition can be accurately computed. Accordingly, the PM emission amount and the PM emission accumulated-amount (integrated amount) during the whole engine operation conditions including the transient state as well as the steady state can be estimated with high accuracy. Hence, the present invention is suitably applicable to the PM emission amount estimation device for the diesel engine provided with a DPF installed in the exhaust gas passage of the diesel engine.

The invention claimed is:

1. A PM emission amount estimation device of a diesel engine provided with a DPF (Diesel Particulate Filter) collecting a PM (Particulate Matter) that is emitted from an exhaust gas passage of the engine, the PM emission amount estimation device comprising:
 a PM emission amount estimation base-map with which a base PM emission amount is computed in response to an operating state of the engine;
 a PM emission amount estimation correction-device that determines a correction factor for correcting the base PM emission amount computed by the PM emission amount estimation base-map in response to a transient state of the engine;
 a transient state judgment device that judges that the engine is operated in the transient state based on a change of an air excess ratio regarding the engine;
 a PM emission amount computation device that corrects the computed base PM emission amount by using the correction factor computed with the PM emission amount estimation correction-device only in a case where the transient state judgment device judges that the engine is in a transient operation condition, whereas the base PM emission amount is outputted in a case where the transient state judgment device judges that the engine is in a steady operation condition; and
 a PM emission accumulation amount device that integrates the PM emission amount which is computed in the PM emission amount computation device,
 wherein the transient state judgment device judges whether the engine is operated in a transient operation condition or a steady operation condition, in a manner that
 a current value of the air excess ratio is subtracted by a former value of the air excess ratio;
 the subtracted value is divided by a measurement time interval to obtain a calculated value; and
 the judgment whether the engine is operated in a transient operation condition or a steady operation condition is judged by comparing the calculated value with a threshold value, and
 wherein the threshold value is set so that a PM emission integrated amount which is computed in the PM emission accumulation amount device agrees with an actual PM emission integrated amount.

2. The PM emission amount estimation device of the diesel engine according to claim 1, wherein the transient state judgment device judges whether the engine is operated in a transient operation condition or a steady operation condition, in a manner that
 the divided subtracted-value is passed through a first order lag low-pass filter so as to remove noise components; and
 the judgment whether the engine is operated in a transient operation condition or a steady operation condition is judged by comparing the calculated value from which the noise is removed with the threshold value.

3. The PM emission amount estimation device of the diesel engine according to claim 1, wherein the PM emission amount estimation correction-device is a PM emission amount estimation correction-map that is established as a function of at least the air excess ratio.

4. The PM emission amount estimation device of the diesel engine according to claim 3, wherein the PM emission amount estimation correction-map is further established as a function of an engine speed and a fuel injection amount as well as the air excess ratio.

5. The PM emission amount estimation device of the diesel engine according to claim 4, wherein the PM emission amount estimation correction-map is further established as a function of an oxygen concentration regarding an air charged into a combustion chamber.

6. The PM emission amount estimation device of the diesel engine according to claim 3, wherein the PM emission amount estimation correction-map is further established as a function of an oxygen concentration regarding an air charged into a combustion chamber.

7. The PM emission amount estimation device of the diesel engine according to claim 1, wherein the PM emission amount estimation correction-device determines the correction factor based on a transient gain formula led from the air excess ratio.

8. The PM emission amount estimation device of the diesel engine according to claim 1, the device comprising a first order lag element that is capable of performing a first order lag operation for the input of the first order lag element and outputting the result of the first order lag operation,
 wherein
 the first order lag operation by use of the first order lag element is executed and the output result thereof is used as the correction factor in multiplying the base PM emission amount by the correction factor in a case where the PM emission amount is decreasing toward negative direction, the correction factor before the execution of the first order lag being determined by use of the PM emission amount estimation correction-device; and
 the correction factor inputted into the first order lag element is outputted through the first order lag element without the first order lag operation and the output from the first order lag element is used as the correction factor in multiplying the base PM emission amount by the correction factor in a case where the PM emission amount is increasing toward positive direction, the correction factor inputted into the first order lag element being determined by use of the PM emission amount estimation correction-device.

9. The PM emission amount estimation device of the diesel engine according to claim 8,
 wherein
 a time constant of the first order lag element is reduced as the correction factor becomes greater, the correction factor being determined by the PM emission amount estimation correction-device.

10. A PM emission amount estimation device of a diesel engine provided with a DPF (Diesel Particulate Filter) collecting a PM (Particulate Matter) that is emitted from an exhaust gas passage of the engine, the PM emission amount estimation device comprising:
 a PM emission amount estimation base-map with which a base PM emission amount is computed in response to an operating state of the engine;
 a PM emission amount estimation correction-device that determines a correction factor for correcting the base PM emission amount computed by the PM emission amount estimation base-map in response to a transient state of the engine;

a transient state judgment device that judges that the engine is operated in the transient state based on a change of an air excess ratio regarding the engine;

a PM emission amount computation device the corrects the computed base PM emission amount by using the correction factor computed with the PM emission amount estimation correction-device only in a case where the transient state judgment device judges that the engine is in a transient operation condition, whereas the base PM emission amount is outputted in a case where the transient state judgment device judges that the engine is in a steady operation condition; and a first order lag element that is capable of performing a first order lag operation for the input of the first order lag element and outputting the result of the first order lag operation, wherein the first order lag operation by use of the first order lag element is executed and the output result thereof is used as the correction factor in multiplying the base PM emission amount by the correction factor in a case where the PM emission amount is decreasing toward negative direction, the correction factor before the execution of the first order lag being determined by use of the PM emission amount estimation correction-device, and the correction factor inputted into the first order lag element is outputted through the first order lag element without the first order lag operation and the output from the first order lag element is used as the correction factor in multiplying the base PM emission amount by the correction factor in a case where the PM emission amount is increasing toward positive direction, the correction factor inputted into the first order lag element being determined by use of the PM emission amount estimation correction-device.

11. The PM emission amount estimation device of the diesel engine according to claim 10, wherein a time constant of the first order lag element is reduced as the correction factor becomes greater, the correction factor being determined by the PM emission amount estimation correction-device.

\* \* \* \* \*